United States Patent [19]

Aines et al.

[11] Patent Number: 5,681,130
[45] Date of Patent: Oct. 28, 1997

[54] ACTIVE COOLING-BASED SURFACE CONFINEMENT SYSTEM FOR THERMAL SOIL TREATMENT

[75] Inventors: Roger D. Aines, Livermore; Robin L. Newmark, Pleasanton, both of Calif.

[73] Assignee: Regents of the University of California, Oakland, Calif.

[21] Appl. No.: 603,112

[22] Filed: Feb. 20, 1996

[51] Int. Cl.⁶ .................. B09B 3/00; A62D 3/00
[52] U.S. Cl. ............ 405/130; 405/128; 405/131; 405/258; 588/1; 588/249; 62/260
[58] Field of Search ............ 405/128, 129, 405/258, 130, 131; 588/249, 259, 260; 62/260

[56] References Cited

U.S. PATENT DOCUMENTS

| | | | |
|---|---|---|---|
| 3,220,470 | 11/1965 | Balch | 405/130 X |
| 3,528,252 | 9/1970 | Gail | 405/130 |
| 4,966,493 | 10/1990 | Rebhan | 405/131 X |
| 4,984,594 | 1/1991 | Vinegar et al. | 405/131 X |
| 5,066,166 | 11/1991 | Hansen | 405/131 X |
| 5,193,934 | 3/1993 | Johnson et al. | 405/131 X |
| 5,261,765 | 11/1993 | Nelson | 405/131 X |
| 5,271,693 | 12/1993 | Johnson et al. | 405/128 |
| 5,416,257 | 5/1995 | Peters | 405/130 X |
| 5,449,251 | 9/1995 | Daily et al. | 405/128 |
| 5,482,402 | 1/1996 | Nelson | 405/128 |

*Primary Examiner*—Dennis L. Taylor
*Attorney, Agent, or Firm*—Daryl S. Grzybicki; Henry P. Sartorio

[57] ABSTRACT

A thermal barrier is disclosed for surface confinement with active cooling to control subsurface pressures during thermal remediation of shallow (5-20 feet) underground contaminants. If steam injection is used for underground heating, the actively cooled thermal barrier allows the steam to be injected into soil at pressures much higher (20-60 psi) than the confining strength of the soil, while preventing steam breakthrough. The rising steam is condensed to liquid water at the thermal barrier-ground surface interface. The rapid temperature drop forced by the thermal barrier drops the subsurface pressure to below atmospheric pressure. The steam and contaminant vapors are contained by the thermal blanket, which can be made of a variety of materials such as steel plates, concrete slabs, membranes, fabric bags, or rubber bladders.

20 Claims, 1 Drawing Sheet

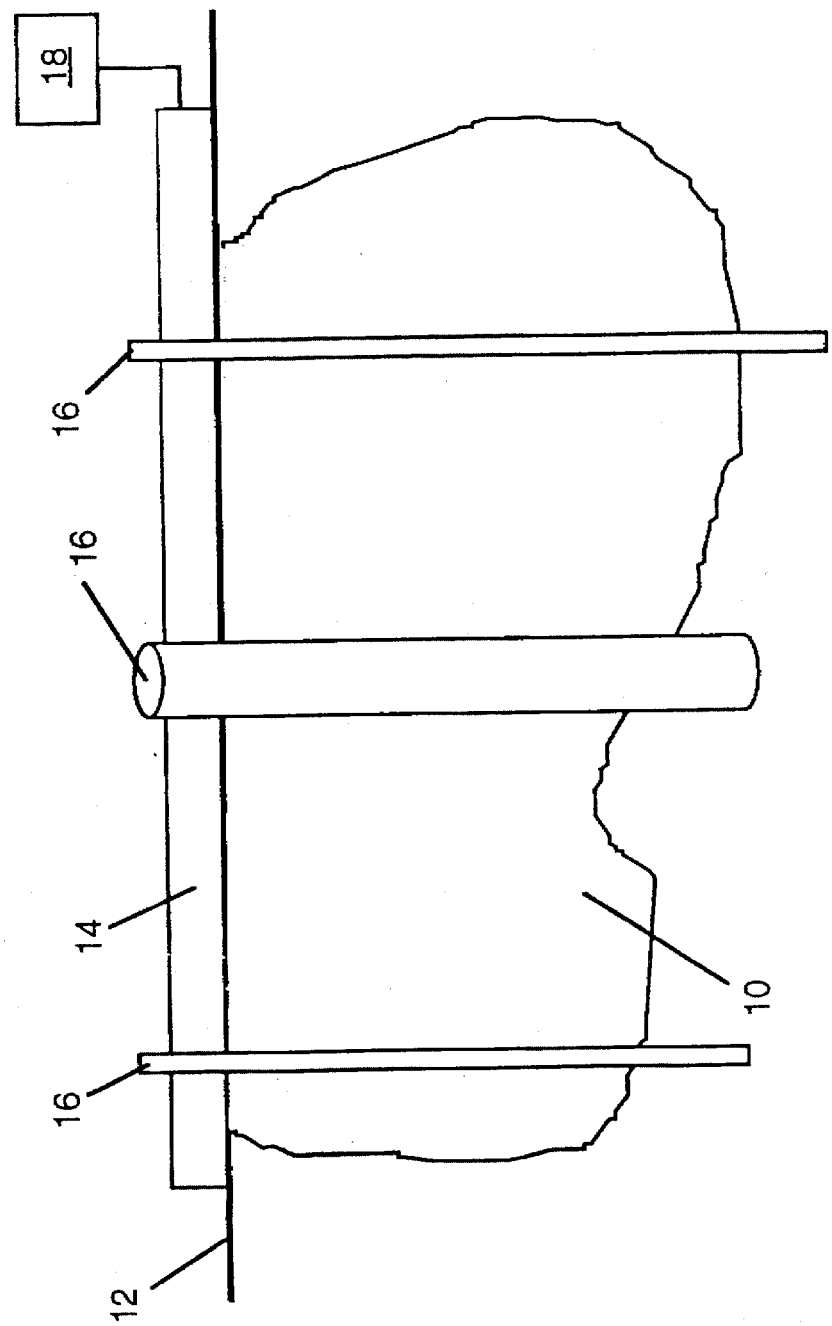

ACTIVE COOLING-BASED SURFACE CONFINEMENT SYSTEM FOR THERMAL SOIL TREATMENT

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method for controlling subsurface pressure by actively cooling a ground surface undergoing thermal treatment of the underlying soil. The method employs a thermal barrier or "blanket" to control the temperature at the ground surface and to confine rising gases or vapors beneath the barrier.

2. Description of Related Art

Underground heating has been shown to be effective for enhancing the removal of organic contaminants deep in soils, such as for removing gasoline at depths of 60 to 140 feet. In particular, underground heating by steam injection has been successfully used by Lawrence Livermore National Laboratory to remediate large non-aqueous phase liquid spills. Other remediation systems based on steam include AT&T's steam-nutrient enhancement system and Western Research Institute's contained recovery of oily wastes. Other thermal remediation methods using electrical and microwave heating are being developed, including Pacific Northwest Laboratory's six-phase soil heating, and Illinois Institute of Technology's microwave heating system.

The intense interest in thermal remediation systems reflects the high efficiency of removal of volatile compounds when heat is applied. When the boiling point of the organic contaminants is exceeded, their vaporization is rapid and complete. Indeed, most contaminants are readily removed even from solution in water by boiling and removing a small fraction of the water. This "steam distillation" process is well known in the waste-recovery field, where steam-stripping towers are used to recover very large percentages of volatile contaminants in process water.

In all cases, the ability to intensively heat soil near the ground surface has limited these projects to depths greater than 20 feet. For shallow volatile contaminants, such as those found in landfills, the pressure at which steam can be injected is severely limited by the lack of confining overburden. In order to prevent steam from exiting the ground surface, injection pressures are limited to less than the lithostatic load (the weight of soil overlying the injection interval). The lithostatic load restriction reduces the allowed pressure to less than 10 psi, or about 0.5 psi per foot of injection depth.

At these low pressures, the saturated steam is not very hot—only slightly above the atmospheric boiling point. Furthermore, for shallow injection, the required low injection pressures of a few psi greatly limit flow rates. The reduced flow rates and reduced pressure to penetrate the formation result in extremely long heating times. In contrast, higher pressures, such as the 60 psi typically used for thermal remediation, produce higher temperature steam (140° C.). More steam is injected under these conditions, and therefore more heat is added to the formation, ultimately speeding up the clean-up process.

High injection pressures, however, can cause steam breakthrough to the surface, which results in both a thermal hazard to operators and a likely environmental problem as contaminants are transported by the steam. Although vapors naturally escape from the ground as a response to barometric pressure pumping, the expected increase in contaminant vapor concentration at a heated site must be addressed. Simple application of pressure to a surface could be used to contain steam, but the immense mass of material required to withstand a pressure of even 1/10 bar (1 psi) is beyond reasonable limits. A one-inch plate of steel over the entire surface would be easily lifted by this pressure.

There is a compelling need in environmental remediation, where injected steam combines with the toxic chemicals being removed, to condense and remove contaminant at the surface, thus restricting its release to the atmosphere. It is desirable to provide a remediation process that eliminates surface breakthrough while allowing higher injection pressures to remove shallow contaminants safely and efficiently.

SUMMARY OF THE INVENTION

The present invention uses a thermal barrier for surface confinement with active cooling during thermal remediation of an underground soil region. The thermal barrier is placed in contact with the ground surface and actively cools the surface while the soil underneath is heated. As gases or vapors in the soil rise to the surface, they are cooled and condensed at the thermal barrier-ground surface interface. The subsurface pressure is thereby controlled by controlling the surface temperature.

This method is particularly useful for thermal remediation involving steam injection. The thermal barrier prevents steam breakthrough during thermal remediation of shallow underground contaminants. The active cooling allows steam to be injected into soil at pressures much higher than the confining strength of the soil (or the contaminant barrier). The steam is condensed to liquid water at the barrier-surface interface. The forced persistence of two phases, steam and water, controls the pressure to that of the equilibrium pressure (<1–2 psi) at the coolant temperature.

Steam may be injected at depths greater than several feet (5–20 feet) at relatively high pressures (20–60 psi) and be allowed to permeate the soil and rise to the surface, where the rapid temperature drop forced by the thermal barrier drops the pressure to below atmospheric pressure. All vapors are contained by the cooling barrier, which can be made of a variety of materials, such as steel plates, concrete slabs, membranes, fabric bags, or rubber bladders. The bags or bladders contain water or another cooling fluid, such as air. This thermal "blanket" concept permits safe and effective use of steam injection in shallow sites (e.g., <5 m in depth) for environmental restoration.

The escape of vapor from the ground surface of a heated area is of concern in all environmental remediation work. Thus, this invention is useful in the thermal remediation of landfills, oil spills, sumps, and other shallow contaminants. Many landfills contain solvents and fuels in addition to solid materials; thermal remediation allows removal of these contaminants without disturbing the majority of the landfill or excavation. A portable system using the present invention can "walk" around a landfill site and remove all volatiles, rendering the landfill safe without excavation.

The thermal barrier is also useful in any soil treatment method in which an underground site is heated (such as by steam, electricity, or radiofrequency waves) and evolves vapors from the soil that must be condensed or contained. Soil treatment may include, for example, soil sterilization or the destruction of undesirable microbes or other organisms in the soil.

BRIEF DESCRIPTION OF THE DRAWINGS

FIG. 1 is a sectional view of an underground region undergoing thermal remediation using the thermal barrier for active surface cooling.

DETAILED DESCRIPTION OF THE INVENTION

The present invention involves the use of a thermal barrier to control the ground subsurface pressure by active cooling. This barrier is placed in contact with the ground surface, and a region underneath the barrier is heated for remediation. The cooling capacity of the barrier is controlled so that rising gases and vapors in the soil are condensed and confined beneath the barrier. This method of active surface cooling is particularly useful in underground remediation of shallow soil contaminants using steam injection.

For illustrative purposes, FIG. 1 shows a sectional view of an underground region 10 of soil with contaminants to be extracted through the use of thermal remediation. The ground surface 12 above the soil region 10 is covered with the thermal barrier 14. The barrier 14 may be in direct contact with the ground surface 12 or with a layer of another material (not shown), such as gravel or sand, which is placed on top of the ground surface 12 and is more permeable than the native ground material. As the soil region 10 is heated, the volatile contaminants may rise to the surface 12, or be actively drawn to the surface 12, such as by vacuum. The region 10 may be heated using a variety of techniques, such as resistive (joule) heating, steam heating, or radiofrequency (RF) heating. Wells 16 for heating and extraction may be arranged in different patterns within and outside the perimeter of the soil region 10. Wells 16 are shown as sunk vertically; however, these wells could also be horizontal and at or near the surface 12.

As the volatiles rise to the ground surface 12, the temperature at the ground surface 12 is monitored and the cooling capacity of the thermal barrier 14 is controlled to actively cool the ground surface 12. When the volatiles reach the cooled surface 12, the temperature of the gases or vapors drops, thereby lowering the subsurface pressure. Typically, the gases or vapors condense at the thermal barrier-ground surface interface, which causes a very large pressure drop. The condensate may be formed in the gravel layer, which can then be scraped off and removed from the site, or pumped off as a liquid.

The barrier 14, or thermal "blanket", can be in many forms, depending on the application. The barrier 14 contains or confines the gases or vapors that are to be extracted, and is therefore impermeable to them. Furthermore, the barrier 14 has a cooling capacity that can be controlled and varied to actively control the temperature of the ground surface 12. Embodiments of the barrier 14 include steel plates, membranes, water-filled bags or bladders, and concrete slabs. The thermal barrier 14 typically contains a coolant fluid, such as water or air, which is used to actively cool the barrier and the ground surface. Coolant circulating means 18, for example, may be used to circulate a coolant though the barrier 14 and control the temperature and flow rate of the coolant.

A specific application of the thermal barrier is the remediation of a landfill using steam injection and vacuum extraction of volatile contaminants (See U.S. Pat. No. 5,449, 251 for a description of dynamic underground stripping). The contaminated region is typically shallow (<20 feet) and the soil is uniformly permeable. Wells for steam injection and vacuum extraction are arranged in a pattern about the contaminated region, and steam is injected into or around this region to heat the soil. Contaminants are removed from the soil by vacuum extraction.

The subsurface pressure created by the steam injection creates a safety issue for workers and potential for contaminant release into the atmosphere. In general, when steam and water are present simultaneously, the pressure and temperature cannot vary independently. Steam may be condensed to a liquid with an accompanying pressure drop; thus, it is only necessary to control the temperature at the surface in order to control the subsurface pressure. Simple radiation to the air would condense a considerable amount of steam, but by applying an active cooling barrier, condensation can be assured, while also controlling the flow of potentially toxic vapor into the air.

To control the subsurface pressure, the water-impermeable thermal barrier with active cooling capacity is placed on the ground surface. The barrier can take many forms: steel plates or concrete slabs with cooling pipes, sheet membranes (or geomembranes) with water sprayed or pooled on the surface, or coolant-filled fabric bags or rubber bladders. The barrier must maintain good contact with the surface beneath. The native ground surface may be covered by a more permeable material, such as gravel or sand, to facilitate contaminant clean-up. The barrier is impermeable to the volatile contaminants as well as water (liquid and steam).

During heating of the contaminated region by steam injection, the temperature of the ground surface (and underground soil) is monitored, typically with thermocouples. The cooling capacity of the thermal barrier is controlled and varied if needed to achieve the desired surface temperature, typically slightly below the atmospheric boiling point (of water). The thermal barrier typically cools the ground surface using a circulating coolant (with a high heat capacity, such as water). The coolant temperature or flow rate in the coolant circulation system may be varied to adjust the cooling capacity of the barrier and reduce the temperature at the ground surface to the desired temperature.

Cooling the ground surface causes a layer of liquid water to form beneath the thermal barrier and controls the subsurface pressure to the equilibrium point at that temperature. The volatile contaminants in the soil that are heated by the steam are typically vacuum extracted, but may also be condensed and confined beneath the barrier. By providing a barrier with a large cooling capacity, the steam injection pressures and temperatures can be high. Depending on the site's vertical permeability, injection pressures of 40–60 psi are achievable. The temperature limits of electrical heating may be extended to higher values than 100° C. by confining the steam generated in situ by the heating and pressurizing water in the soil, preventing steam from escaping and drying the soil.

In one embodiment, the barrier is composed of construction steel plates (e.g., 1"×4"×8') with cooling pipes welded on the surface. Quick-connect fittings join adjacent cooling systems on each plate. The steam injection and vacuum extraction equipment may rest on top of the plates in the form of tractor-trailers. An area can be plated corresponding to the steam radii desired from an injection well (or a set of injection/extraction wells) so that all the steam stays under the plated area. In this steel plate configuration, each plate has an access port for extraction/injection wells. The well casing for these wells is removable and pressure sealed to the plate to maintain the control of steam at the surface. If cooling pipes are welded onto the surface of the plates, an additional wooden superstructure (e.g., with plywood covering) can be used to maintain vehicle traffic.

After steam injection, the vacuum extraction phase continues until the area is cool enough to no longer require plates. The plates are picked up and moved to the next section of the landfill, thus allowing the entire apparatus to "walk" across the landfill. Remediation takes place in unit cells. The plates can also support heavy extraction equipment, fork lifts, and operators on the surface of the landfill. At the edge of the plates or behind the moving system, membranes can be installed to temporarily continue to control the influx of air in areas no longer requiring control of heat, but which are still undergoing vacuum extraction using the residual heat.

In an alternative configuration, the thermal barrier is made of lightweight concrete slabs with cooling pipes embedded within the slabs. The slabs can be manufactured to be larger per unit weight than the steel plates. The boiler assembly (for steam injection) may ride on top of the slabs as they are moved across the area to be remediated. The boiler water can be passed through the cooling plates first for pre-heating, thereby exploiting the heat generated at the ground surface. Valves on the inlet to each plate's cooling system are temperature actuated, opening larger as the coolant heats up. In this way, a series of plates can be hooked to a single water source in parallel, and coolant can be applied uniformly without significant operator interaction.

In the preferred embodiment for the actively cooled surface barrier, a set of water-filled bags are used to cover the remediation area in a patchwork. In general, the active cooling thermal barrier must have sufficient cooling capacity to condense steam rising below it, and must be rugged enough to withstand chemicals, rough usage, uneven steam heating, and sunshine. The use of flexible, fabric water-filled bags or rubber bladders on the ground surface fulfills all these conditions.

While the contaminated underground region is being heated, water for the boiler may be first passed through the bags to provide the active cooling. The bags are relatively thin (approximately 1 ft thick) and use standard firehose fittings on the inlet and outlet, with a pressure relief valve. The top material is UV-resistant, while the bottom material is resistant to chemical attack. If necessary, a layer of gravel may be installed under the bags to trap and extract vapor and condensate. The bags are left in place for as long as the cooling (cool down) or containment is required.

Thermal Blanket Comparison

The active surface cooling provided by the thermal blanket concept should enable high steam injection rates to be applied in subsurface remediation techniques. Using conventional methods in a steam injection cleanup from surface to 11 m depth, typically hundreds of days are required to heat a 10,000 yd$^3$ site with steam, due to the low allowed injection pressures. The injection pressure (about 6.5 psi) is constrained by the lithostatic load, and the injection temperature is about 111° C.

Placing an active cooling thermal barrier on the surface changes the thermal constraints, which allows the injection rate and temperature to increase, dramatically reducing the heating time to under 100 days. With the temperature at the surface constrained to 25° C., the injection rate can be increased by 3000%, and the injection temperature increased from 111° C. to 160° C. The remediation time is dramatically decreased, from 360 days using the conventional methods to 50 days using the higher injection pressures permitted by the thermal blanket.

The required cooling capacity of a bag as a thermal barrier may be calculated assuming ground at steam temperature, full solar loading, and reasonable heat transfer properties for the thermal blanket material (e.g., fabric, rubber). The cooling capacity has been calculated assuming inlet water at 60° F. and constraining the outlet temperature to 120° F. With full consideration of flow rate (15 gpm), pressure drop, convection, heat capacities, and bag dimensions, a 15'×20'× 3" (rubberized fabric) bag may maintain a cooling rate of 5000 W/m$^2$.

The foregoing description of preferred embodiments of the invention is presented for purposes of illustration and description and is not intended to be exhaustive or to limit the invention to the precise form disclosed. Many modifications and variations are possible in light of the above teaching.

What is claimed is:

1. A method for controlling subsurface pressure by actively cooling a ground surface overlying soil for thermal remediation of a shallow soil region containing contaminants, comprising:

placing a thermal barrier in contact with the ground surface to actively cool the surface, wherein the barrier has an active cooling capacity and is impermeable to a selected gas or vapor in the soil region;

heating the soil region beneath the barrier for remediation;

controlling the cooling capacity of the barrier to control the pressure and temperature of the selected gas or vapor in the soil region.

2. A method as recited in claim 1, wherein heating the soil is carried out by heating methods selected from the group consisting of resistive (joule) heating and radiofrequency (RF) heating.

3. A method as recited in claim 1, further comprising:

vacuum extracting contaminants from the soil beneath the barrier.

4. A method as recited in claim 1, wherein the selected vapor is steam and heating the soil is carried out by injecting steam into the soil beneath the barrier.

5. A method as recited in claim 4, wherein the steam injection is carried out at a depth of less than about 50 feet.

6. A method as recited in claim 4, wherein the steam injection is carried out at injection pressures of greater than about 0.5 psi/ft.

7. A method as recited in claim 1, further comprising flowing a coolant fluid through the barrier.

8. A method as recited in claim 7, wherein controlling the cooling capacity of the barrier is carried out by changing the temperature of the coolant fluid.

9. A method as recited in claim 7, wherein controlling the cooling capacity of the barrier is carried out by changing the flow rate of the coolant fluid.

10. A method as recited in claim 1, further comprising pooling or spraying a coolant fluid on the barrier.

11. A method as recited in claim 1, wherein the selected gas or vapor condenses between the barrier and the ground surface.

12. A method as recited in claim 1, further comprising placing a layer of material between the ground surface and the thermal barrier, wherein the material is more permeable than the ground surface.

13. A method as recited in claim 1, wherein the barrier is impermeable to water vapor.

14. A method as recited in claim 1, wherein the barrier is selected from the group consisting of metal plates, concrete slabs, a membrane sheet, coolant-filled bags, and coolant-filled bladders.

15. A method as recited in claim 1, wherein heating the soil is carried out by heating to temperatures above the boiling point of water.

16. A method as recited in claim 1, wherein the barrier further comprises ports for wells selected from the group consisting of steam injection wells and vacuum extraction wells.

17. A method of controlling subsurface pressure by actively cooling a ground surface for thermal treatment of underlying material, comprising:

plating a barrier in contact with a ground surface overlying material to be treated, wherein the barrier is impermeable to a selected gas or vapor and has an active cooling capacity;

controlling the cooling capacity of the barrier to control the temperature of the surface;

confining the gas or vapor beneath the barrier.

18. A method as recited in claim 17, wherein the underlying material is soil, and further comprising heating the soil beneath the barrier.

19. A method as recited in claim 18, wherein heating the soil is carried out by injecting steam into the soil beneath the barrier.

20. A method as recited in claim 18, wherein the gas or vapor is condensed at the barrier-surface interface.

* * * * *